Figure 1:
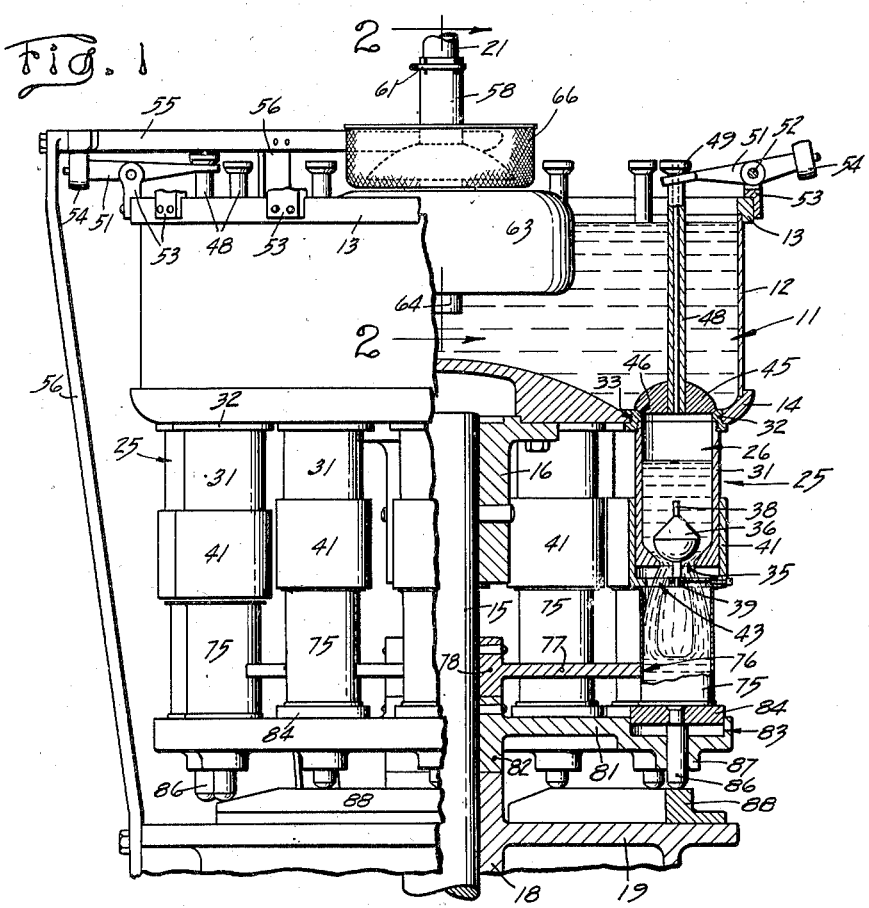

May 10, 1938.  C. W. BURTON  2,116,505

VALVE FOR FILLING MACHINE

Filed May 24, 1934

INVENTOR
Charles W. Burton
BY
ATTORNEYS

Patented May 10, 1938

2,116,505

UNITED STATES PATENT OFFICE 2,116,505

VALVE FOR FILLING MACHINES

Charles W. Burton, Vancouver, British Columbia, Canada, assignor to American Can Company, New York, N. Y., a corporation of New Jersey Application May 24, 1934, Serial No. 727,368

4 Claims. (Cl. 137—104)

The present invention relates to machines for filling liquids into cans and has particular reference to devices for more accurately controlling the filling of uniform weight charges of liquid into the cans by segregating given quantities of the liquid as determined by its specific gravity.

The invention is particularly adaptable to the filling of evaporated milk or the like into cans. There are various grades of milk ranging from heavy to light, known and graded in the trade according to its specific gravity. The heavier grade of milk has the greater specific gravity and therefore a given quantity of heavy milk will weigh more than the same quantity of a milk of lesser specific gravity.

In filling milk or the like into cans the requirement of consistently uniform net weight of fill is desirable irrespective of grade or specific gravity. To accomplish this uniform weight fill the instant invention contemplates the segregation of individual charges of milk prior to filling and accurately controls the net weight of the charges by providing for variation in the quantity or amount of milk segregated to form each charge, the actual quantity segregated having the same weight.

An object of the present invention is the provision of can filling instrumentalities for measuring charges of milk to desired weight of the fill going into the can, such measuring being determined by the specific gravity of the milk.

Another object of the invention is the provision of devices in can filling instrumentalities of the character described which function to control the quantity of milk admitted into each can.

A further object is the provision of manually adjustable means for regulating the controlling devices in accordance with the specific gravity of the milk.

A still further object of the invention is the provision of can filling instrumentalities for measuring and segregating charges of milk from a reservoir and filling into cans to obtain a uniform weight of fill, while maintaining a given level in the reservoir for each specific gravity of milk being handled.

Another object is the provision of an anti-foam device for conducting milk into the reservoir of such a can filling machine and for more accurately maintaining a definite milk level.

Numerous other objects and advantages of the invention will be apparent as it is better understood from the following description, which, taken in connection with the accompanying drawing, discloses a preferred embodiment thereof.

Figure 2:
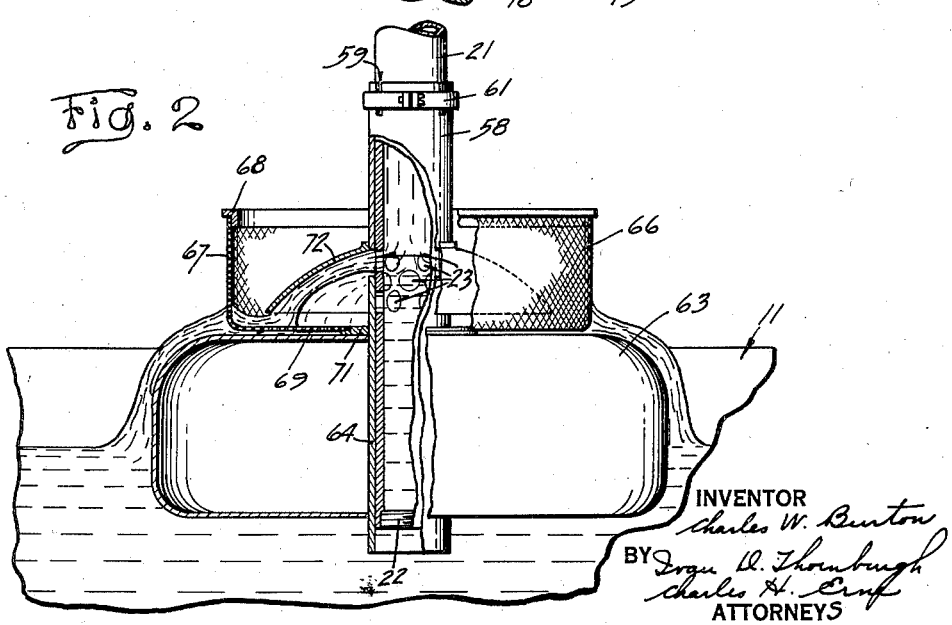

Referring to the drawing:

Figure 1 is a part elevation, part sectional view of a filling machine embodying the present invention; and Fig. 2 is an enlarged fragmentary view, shown partly in elevation and partly in section, of the control devices illustrated in the upper part of Fig. 1.

The apparatus illustrated in the drawing as a preferred embodiment of the present invention comprises a continuously rotating reservoir for holding milk which is conveyed to the reservoir through a main supply pipe connecting with a suitable source of milk supply. This reservoir is provided with a plurality of milk filling units depending from its bottom and designed and coordinated for selecting desired charges of milk, during high speed automatic filling action.

Empty cans are placed in the machine in any suitable manner either manually or automatically, and directly under the filling units. These cans are held in position within pockets of a turret the latter being located beneath the reservoir and rotating with it. Each positioned can rests upon a vertically movable lifter plate disposed within a disc carrier associated with the turret.

Each of the filling units comprises a segregating or filling chamber communicating with the reservoir through an intake valve located in the top of the measuring chamber. This valve is periodically operated by a stationary cam and is equipped with an auxiliary measuring tube communicating at its lower end with the interior of the measuring chamber. This tube extends vertically into the reservoir, terminating above the milk level. The lower or discharge end of the measuring chamber is normally closed by a discharge valve and this valve is opened at the proper time for filling.

At the time a can is placed in the machine on its lifter plate, the intake valve of that particular measuring chamber is open and milk is flowing into the chamber from the reservoir. The chamber is first completely filled and then the milk rises in the auxiliary measuring tube to the level of the milk in the reservoir. The intake valve is thereupon closed, trapping a given quantity of milk in the measuring chamber and in the tube, thus segregating this milk from all other milk in the machine.

This trapped milk is of a definite weight and volume and knowing the specific gravity of the particular batch of milk the volume is predetermined to provide for the desired net weight to go into the can. The level of the milk in the reservoir is accordingly regulated at all times to correspond with the required volume of milk segregated in the chamber and in the tube.

A constant milk level for each specific gravity is maintained by a float riding in the milk within the reservoir and this float controls the opening and closing of an inlet valve associated with the main supply pipe. To obtain the greatest accuracy, the level in the reservoir must be definite and clear cut and this optimum cannot be obtained where there is foaming, as is usual in reservoirs where the milk is permitted to discharge directly into the body of liquid. This foaming is reduced to a minimum in the instant case, the milk being first introduced into an anti-foam screen and thence allowed to run quietly down and over the sides of the float and into the reservoir.

After segregation of a given charge of milk in its measuring chamber, the associated lifter plate is raised by cam action, the empty can thereon being brought into engagement with the measuring chamber discharge valve. Continued lifting moves the can into filling position and at the same time the can opens the valve and permits the segregated charge of milk to flow out and into the can. After this filling operation, the can is lowered back to its original level, which lowering automatically closes the discharge valve. The filled can is then discharged from the machine in any suitable manner.

The disclosed embodiment of the invention comprises a cylindrical reservoir generally indicated by the numeral 11 (Fig. 1) and which is composed of an annular band of sheet metal forming side walls 12. This band is secured at its upper edge to a circular rim 13 and at its lower edge to a circular horizontally curved bottom plate 14.

The reservoir 11 is centrally mounted on the upper end of a vertical shaft 15 and turns with it on its central axis. A flanged hub 16 is bolted direct to the bottom plate 14 and this hub is mounted on and is pinned to the end of the shaft. Shaft 15 is journaled in a bearing 18 formed in the top of a main frame 19 which is designed to support the working parts of the machine. Only the upper part of this frame and the upper part of the shaft are illustrated, the latter extending below the bearing 18 where it may be further supported and rotated as desired.

The milk is supplied to the reservoir from any suitable source of supply and passes through a vertical pipe 21 which is centrally disposed above the reservoir. The lowermost end of this pipe 21 is closed by a plug 22 (Fig. 2) while a series of holes 23 is provided in its side wall near the lower end through which the milk discharges into the reservoir.

While the reservoir is revolving, portions of this milk are being measured out and segregated as has already been described and this is effected through a series of filling heads 25 (Fig. 1) suspended from the bottom of the reservoir and arranged adjacent its outer periphery. Each filling head incloses a measuring chamber 26.

Each filling head 25 is formed with an open top tubular body 31 threaded at its upper end into a bushing 32. This bushing is screwed into an opening 33 formed in the bottom plate 14 of the reservoir. This construction provides communication between the reservoir and the measuring chamber and the milk passes into the latter through the open end of the tubular body.

At its lower end the body 31 is closed but for a restricted discharge opening 35 and this opening may be closed by a discharge valve 36. Valve 36 is fixed upon and is carried by the upper end of a vertical rod 38 and the lower end of the rod passes through the restricted opening 35 and is secured in a central boss 39 of a tubular valve lift member or sleeve 41. This valve member 41 partially encircles and slidably engages the lower end of the body 31. The bottom of the valve member is provided with milk discharge openings 43 and when it is raised for discharging it raises the valve 36 and opens the discharge opening 35.

The upper end of the segregating and measuring chamber 26 is partially closed by an intake valve 45 which cooperates with a valve seat 46 formed in the top of the bushing 32. Valve 45 is disposed on the lower end of a vertical tube 48 the interior of which is at all times in communication with the measuring chamber. The top of the tube is at all times open to the atmosphere, its top end projecting above the reservoir rim 13 and terminating in an enlarged head 49.

The intake valve 45 is opened and closed during each rotation of the reservoir, the valve movement being effective through a lever 51 which is pivoted on a stud 52 held in a bracket 53 carried on the rim 13. One end of this lever is enlarged and loosely encircles the tube 48 below the head 49. The other end of the lever carries a cam roller 54 which is carried under and engages with a stationary cam 55 positioned above and partially surrounding the reservoir 11. This cam 55 may be held in position by vertically disposed supporting bars 56 which at their lower ends are bolted to the main frame 19.

When the cam tilts the lever 51 on its pivot point its enlarged end engages the tube head 49 and lifts the tube 48 and with it the intake valve 45. Milk thereupon flows into the chamber 26 completely filling it and then the milk rises in the tube 48 until the level there equals the level in the reservoir.

The height of this level in the reservoir determines the weight of the measured charge of milk which is in the combined chamber 26 and tube 48 and which will later be segregated and discharged into the can. Since the capacity of the measuring chamber is constant the tube provides for the variation necessary to produce a desired resulting weight of fill for a given specific gravity milk. The space within the tube therefore acts as an auxiliary measuring chamber.

The device for controlling the milk level in the reservoir comprises a sleeve 58 (Fig. 2) slidably and adjustable mounted on the main milk supply pipe 21 adjacent the pipe discharge openings 23. The upper edge of the sleeve is slit as at 59 and these slits render the sleeve flexible. A contractible clamping band 61 encircles the sleeve directly over the slits and springs the flexible edge into tight clamping position on the pipe 21. This sleeve part of the level control device may be manually set in this way to provide a limit stop for a float unit which is also a part of the level control.

The float unit includes a hollow cylindrical float 63 mounted on and secured to a tubular sliding sleeve 64. This sleeve with its float is located on the lower end of the milk supply pipe 21 and moves up and down as the milk level changes. At such a time the sleeve partially or completely covers or uncovers the milk discharge openings 23, and in so doing functions as an inlet valve for the milk supply pipe.

The float will be supported at a higher level by milk of a greater specific gravity than by milk of a less specific gravity, and in the latter case the milk will stand normally at a higher level in the reservoir 12 and in the supplemental or auxiliary filling space in the tube 48, so that the auxiliary charge of milk in the tube 48 is less if the milk be heavy and greater if the milk be light.

In setting the control device for a given run of milk, the sleeve 58 is first unclamped from and then moved along the pipe 21. First there is determined the milk level for the reservoir which will give the proper filling level of the segregated charge in the measuring and auxiliary measuring chambers of the parts 26, 48. This may be easily established by drawing off a can of milk and weighing it. Again after a given level has once been established for a given specific gravity of milk this same level will be used for the same grade of milk in subsequent runs.

Having determined the desired reservoir level, the floating position of the upper edge of the sleeve 64 is used as a gage for setting the lower edge of the sleeve 58. With the upper edge of the sleeve 58 against the lower edge of the float sleeve 64 the former is fixed in position by the clamp band 61. In such position the discharge holes 23 are fully covered. A slight lowering of this level immediately uncovers the openings 23 for the admission of enough milk to replenish the diminished supply. It should be understood, however, that the level remains substantially constant, only slight movement of the float taking place to maintain this level and a fairly uniform milk flow passing into the reservoir through partially open holes in the supply pipe 21.

Since any substantial foaming of the milk entering the reservoir mitigates the maintenance of a clear cut level, in the disclosed embodiment of the present invention this milk passes through an anti-foam device before entering the reservoir 11. This device comprises a cylindrical screen 66 having a wire mesh vertical side wall 67 secured to an upper circular rim 68. The cylindrical screen also has a wire mesh bottom 69 which is secured at its center to a washer 71. The entire screen is supported on this washer which is mounted on and fixed to the sleeve 64 adjacent the top of the float 63. This construction insures that both screen and float move together in a cooperative action.

An inverted dish-shaped shield 72 is mounted on the sleeve 58 adjacent its lower end and directs the flow of milk discharging from the openings 23 and passing into the anti-foam screen 66. Any foam created by the discharging milk remains in the screen leaving the milk to pass through the screen and quietly runs down over the top and the sides of the float and into the reservoir without creating any substantial disturbance of the milk level.

After measuring the milk into a uniform weight charge as just described the measured charge is segregated from the rest of the milk in the reservoir. This is effected at a given period in the rotation of the reservoir when the roller 54 of the associated lever 51 rides out from under the stationary cam 55 and allows the valve 45 to drop by gravity onto its seat 46 cutting off communication with the milk in the reservoir.

When the empty can 75 (Fig. 1) is placed in the machine directly under a filling head 25, it is positioned within a pocket 76 of a turret 77. This turret is provided with a central hub 78 mounted on and pinned to the vertical shaft 15, so that rotation of the shaft moves the turret and carries the can through the cycle of the machine.

The shaft 15 also carries a circular disc 81, a central hub 82 thereof being mounted adjacent the turret hub 78. The lower end of the hub 82 rests on the top of the bearing 18 of the frame 19. This bearing thus supports all of the rotating machine parts.

The disc 81 adjacent its periphery is formed with recesses 83 into which lifter plates 84 are normally disposed with the top of the plates flush with the top of the disc. The can 75 when in the turret pocket 76 rests on the lifter plate. A centrally disposed stem 86 depends from the bottom of each lifter plate 84 and this stem is journaled in a bearing 87 formed in the disc 81. The stems ride on a stationary cam 88 which is secured to the top of the frame 19. This cam is semi-circular in shape and extends only a part of the way around the machine. It terminates in substantially vertical alignment with the ends of the intake valve cam 55 so that the two cams are not vertically aligned.

The stem 86 of a can lifter plate is not over the cam 88 when the can 75 is first placed on its lifter plate 84 but immediately following, the stem riding up on the cam surface, lifts the lifter plate and moves its superimposed can into engagement with the perforated bottom of the valve lift member 41. Continued lifting thereupon raises the latter and the discharge valve 36 connected to it and the segregated milk held within the chamber 26 and the tube 48 thereupon flows through the restricted opening 35 and through the openings 43 into the empty can. This empties the measuring chamber.

The stem 86 in its continued rotary travel then rides off the cam 88 and the lifter plate 84 and its filled can return to their original lower position. The can is then discharged from the machine in any suitable manner.

Thus it will be seen that by regulation of the milk level in the reservoir in accordance with its specific gravity, consistently uniform weight charges of milk are automatically measured out, are segregated and are then filled into the cans. The final net weight of fill in each can for a given run of milk, therefore is the same as the fill in every other can of that run.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a filling machine having a liquid reservoir, a pipe for admitting liquid to said reservoir, and valve controlled measuring chambers communicably connected thereto: a float valve for regulating and controlling the admission of liquid and the liquid level in said reservoir, said float valve comprising a lower sleeve member slidably mounted on said pipe, a float member secured to said sleeve, said pipe having apertures disposed near the upper end of said sleeve adapted to be opened and closed by said sleeve, and an upper sleeve member adjustably mounted on said pipe and having its lower end near said apertures for controlling the amount of opening of said apertures.

2. In a filling machine having a liquid reservoir, a pipe for admitting liquid to said reservoir, and valve controlled measuring chambers communicably connected thereto: a float valve for regulating and controlling the admission of liquid and the liquid level in said reservoir, said float valve comprising a lower sleeve member slidably mounted on said pipe, a float member secured to said sleeve, said pipe having apertures disposed near the upper end of said sleeve adapted to be opened and closed by said sleeve, an upper sleeve member adjustably mounted on said pipe and having its lower end near said apertures for controlling the amount of opening of said apertures, and a screen carried by said float and surrounding said apertures for preventing the foaming of liquid discharged from said apertures.

3. In a filling machine having a liquid reservoir, a pipe for admitting liquid to said reservoir, and valve controlled measuring chambers communicably connected thereto: a float valve for regulating and controlling the admission of liquid and the liquid level in said reservoir, said float valve comprising a lower sleeve member slidably mounted on said pipe, a float member secured to said sleeve, said pipe having apertures disposed near the upper end of said sleeve adapted to be opened and closed by said sleeve, an upper sleeve member adjustably mounted on said pipe and having its lower end near said apertures for controlling the amount of opening of said apertures, and a liquid directing shield carried by said upper sleeve.

4. In a filling machine having a liquid reservoir, a pipe for admitting liquid to said reservoir, and valve controlled measuring chambers communicably connected thereto: a float valve for regulating and controlling the admission of liquid and the liquid level in said reservoir, said float valve comprising a lower sleeve member slidably mounted on said pipe, a float member secured to said sleeve, said pipe having apertures disposed near the upper end of said sleeve adapted to be opened and closed by said sleeve, an upper sleeve member adjustably mounted on said pipe and having its lower end near said apertures for controlling the amount of opening of said apertures, and a screen carried by said float and surrounding said apertures for preventing the foaming of liquid discharged from said apertures, and a liquid directing shield carried by said upper sleeve.

CHARLES W. BURTON.